(12) United States Patent
Buchko et al.

(10) Patent No.: US 9,851,044 B2
(45) Date of Patent: *Dec. 26, 2017

(54) ADHESIVE CONNECTION OF A SUPPORT COMPONENT BETWEEN THE ENDS OF A FRAME MEMBER IN A PACKAGING MACHINE

(71) Applicant: CP PACKAGING, INC., Appleton, WI (US)

(72) Inventors: Raymond G. Buchko, Neenah, WI (US); Dwayne C. Long, New London, WI (US)

(73) Assignee: CP Packaging, Inc., Appleton, WI (US)

( * ) Notice: Subject to any disclaimer, the term of this patent is extended or adjusted under 35 U.S.C. 154(b) by 378 days.

This patent is subject to a terminal disclaimer.

(21) Appl. No.: 14/508,475

(22) Filed: Oct. 7, 2014

(65) Prior Publication Data

US 2015/0076317 A1 Mar. 19, 2015

Related U.S. Application Data

(63) Continuation of application No. 12/246,915, filed on Oct. 7, 2008, now Pat. No. 8,869,687.

(51) Int. Cl.
| | | |
|---|---|---|
| *F16M 1/00* | (2006.01) | |
| *F16M 7/00* | (2006.01) | |
| *B21D 53/00* | (2006.01) | |
| *B32B 37/12* | (2006.01) | |
| *B32B 37/14* | (2006.01) | |
| *F16B 11/00* | (2006.01) | |
| *F16B 17/00* | (2006.01) | |
| *B65B 31/02* | (2006.01) | |
| *B65B 9/04* | (2006.01) | |
| *B65B 25/00* | (2006.01) | |

(52) U.S. Cl.
CPC ............... *F16M 7/00* (2013.01); *B21D 53/00* (2013.01); *B32B 37/1284* (2013.01); *B32B 37/142* (2013.01); *B65B 9/04* (2013.01); *B65B 31/028* (2013.01); *F16B 11/006* (2013.01); *F16B 17/00* (2013.01); *F16M 1/00* (2013.01); *B65B 25/001* (2013.01); *Y10T 29/49966* (2015.01); *Y10T 156/10* (2015.01)

(58) Field of Classification Search
CPC ........................... B32B 37/1284; B32B 37/142
See application file for complete search history.

(56) References Cited

U.S. PATENT DOCUMENTS

| | | |
|---|---|---|
| 559,370 A | 5/1896 | Dodge |
| 1,036,242 A | 8/1912 | Hooker |
| (Continued) | | |

FOREIGN PATENT DOCUMENTS

JP       52109732       9/1977

*Primary Examiner* — Amy Sterling
(74) *Attorney, Agent, or Firm* — Boyle Fredrickson, S.C.

(57) ABSTRACT

A food processing apparatus has a frame assembly in which frame members are joined using adhesive, such as an epoxy. The frame members are comprised of stainless steel and the adhesive is applied so that exterior surfaces of the stainless steel frame members are free of any adhesive residue. Adhesive may be used to join exterior frame members as well as interior frame members, such as those used to support mechanical components of the processing apparatus.

4 Claims, 11 Drawing Sheets

(56) References Cited

U.S. PATENT DOCUMENTS

| | | |
|---|---|---|
| 1,785,141 A | 12/1930 | Morton |
| 2,205,397 A | 6/1940 | Drake |
| 2,683,689 A | 7/1954 | Nicholls |
| 3,237,756 A | 3/1966 | Clark |
| 3,511,358 A | 5/1970 | Peterson |
| 3,578,145 A | 5/1971 | Kuehl |
| 3,613,756 A | 10/1971 | Snyder, Jr. et al. |
| 3,621,900 A | 11/1971 | Rood |
| 3,834,513 A | 9/1974 | Miura et al. |
| 3,848,732 A | 11/1974 | Catalano |
| 3,886,858 A | 6/1975 | Evans et al. |
| 3,952,646 A | 4/1976 | Leban |
| 4,015,517 A | 4/1977 | Pomara, Jr. |
| 4,289,563 A | 9/1981 | Wiechowski et al. |
| 4,453,458 A | 6/1984 | Altman |
| 4,460,349 A | 7/1984 | Charron |
| 4,515,819 A | 5/1985 | Shinriki |
| 4,525,542 A | 6/1985 | DeGooyer |
| 4,608,405 A | 8/1986 | DeGooyer |
| 4,674,627 A | 6/1987 | Dussan |
| 4,715,488 A | 12/1987 | Hewitt et al. |
| 4,754,867 A | 7/1988 | De Anda |
| 4,989,723 A | 2/1991 | Bode et al. |
| 5,112,630 A | 5/1992 | Scott |
| 5,168,801 A | 12/1992 | Switek, Jr. |
| 5,174,435 A | 12/1992 | Dorner et al. |
| 5,205,400 A | 4/1993 | Breuss et al. |
| 5,421,446 A | 6/1995 | Koch et al. |
| 5,470,602 A | 11/1995 | Cecil |
| 5,565,507 A | 10/1996 | Marco et al. |
| 6,095,319 A | 8/2000 | Noniewicz et al. |
| 6,179,369 B1 | 1/2001 | Bender et al. |
| 6,209,715 B1 | 4/2001 | Eltvedt |
| 6,227,355 B1 | 5/2001 | White et al. |
| 6,331,223 B1 | 12/2001 | Wylie et al. |
| 6,371,283 B1 | 4/2002 | Manchester |
| 6,422,382 B1 | 7/2002 | Ertel et al. |
| 6,427,831 B1 | 8/2002 | Norton |
| 6,769,536 B2 | 8/2004 | Lutz |
| 7,275,635 B2 | 10/2007 | Enya |
| 7,341,138 B1 | 3/2008 | Wendt et al. |
| 7,681,719 B2 | 3/2010 | Hosch et al. |
| 7,753,194 B1 | 7/2010 | Jager et al. |
| 7,784,749 B2 | 8/2010 | Radermacher |
| 7,921,989 B2 | 4/2011 | Itoh |
| 7,946,415 B2 | 5/2011 | DeGennaro, Jr. |
| 8,707,919 B2 * | 4/2014 | Wagner ............... F01L 1/3442 123/90.17 |
| 8,943,750 B2 * | 2/2015 | Twork, Jr. ............ E05F 11/385 49/352 |
| 9,011,060 B2 * | 4/2015 | Hyatt ................... F16B 39/282 411/136 |

* cited by examiner

ADHESIVE CONNECTION OF A SUPPORT COMPONENT BETWEEN THE ENDS OF A FRAME MEMBER IN A PACKAGING MACHINE

CROSS-REFERENCE TO RELATED APPLICATION

This application is a continuation of U.S. Ser. No. 12/246,915, filed Oct. 7, 2008, now U.S. Pat. No. 8,869,687, issued Oct. 28, 2014.

BACKGROUND AND SUMMARY OF THE INVENTION

The present invention relates generally to food handling equipment and, more particularly, to a frame assembly for a food processing machine having frame members that are interconnected using adhesive.

Food handling machines, such as conveyors and packaging machines, are commonly formed of a stainless steel frame and stainless panels that collectively house the operational components used to carry out a food handling process, or portion thereof. To assemble the frame, the individual frame members are formed and then interconnected such that a number of upright members are connected to one another by a number of transverse support members. The number of upright and transverse members, and their orientation with respect to one another, may vary depending upon the specifics of the food handling machine, but generally, weld joints are used to connect the members.

One of the benefits of stainless steel is its resistance to rust and corrosion. In the food handling industry, this is particularly advantageous as it allows the machine to be cleaned routinely with a reduced risk of rust or corrosion. This advantage is particularly realized when the exposed surfaces of the stainless steel frame are smooth, i.e., is absent pocks, holes, pits, or other type of crevices in which cleaning solution or water may be trapped. Moreover, the lack of any pocks, holes, pits, or crevices is particularly beneficial in the food handling or food packaging industry, as food particulate and other bacteria may otherwise become trapped.

Weld joints, while effective in joining the frame members, contain air pockets and are thus susceptible to moisture retention and/or particle entrapment.

In accordance with the present invention, the frame members of the frame of an item of food processing equipment are joined together using adhesive rather than weld filler. The application of the adhesive can be controlled such that when the frame members are interconnected, the adhesive is not exposed to water, cleaning solution, or food particulate. This is particularly advantageous when connecting internal frame members that are used to support mechanical components of the machine. Thus, the smooth profile that is particularly advantageous for stainless steel frame members is maintained at the union of the frame members. In one representative embodiment, the adhesive is a non-metallic epoxy having a high tensile strength.

Therefore, one object of the present invention is to provide a food processing machine in which its frame and support members are interconnected in a manner that reduces the number of moisture of particulate-trapping areas.

According to another aspect, the invention is directed to the frame of a food processing machine in which the support and frame members are joined together using non-metallic adhesive bonds.

According to another aspect of the invention, a method of assembling a frame of a food processing machine uses adhesive to bond the frame and support members into a frame assembly.

Other aspects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION OF THE DRAWINGS

The present application will be described with respect to a food packaging machine, but it is understood that the invention may also be applicable with other food handling machines as well as non-food handling systems.

Figure 1:
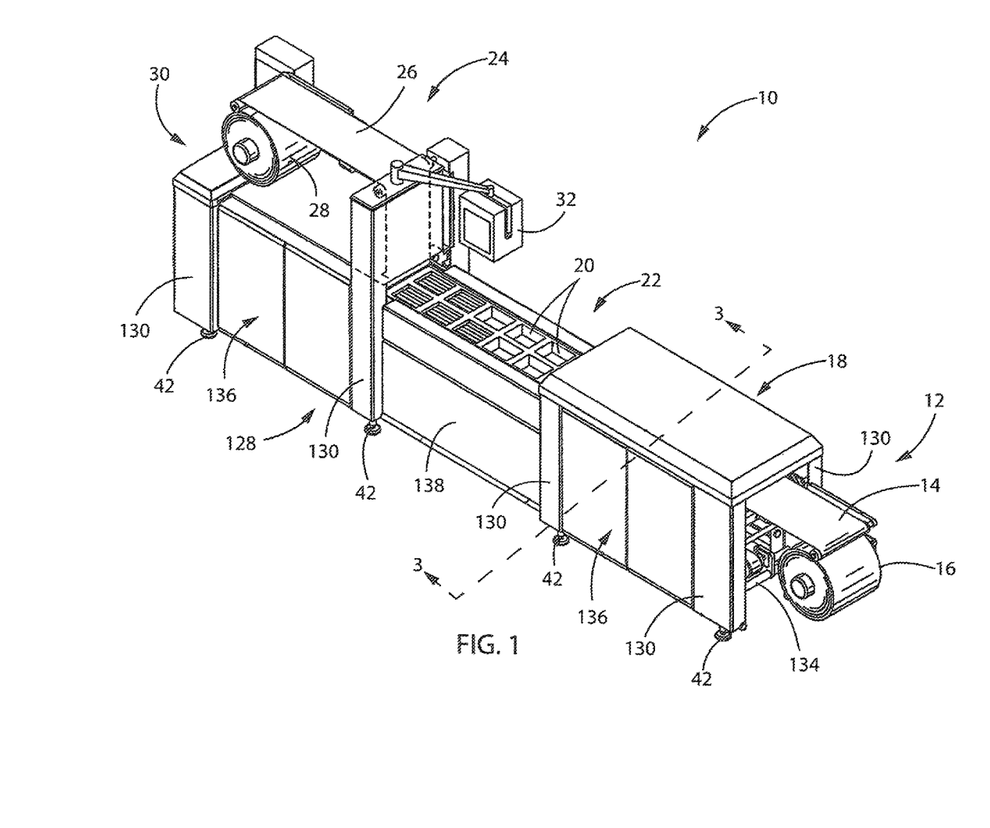
FIG. 1 is an isometric view of a food processing machine constructed according to an aspect of the invention.

FIG. 1 illustrates a food packaging machine 10 that generally includes a lower web supply station 12 for supplying a lower web 14 of flexible web material from a supply roll 16 to a formation station 18. The lower web 14 of flexible material is advanced to the formation station 18 there upon cavities 20 are formed in the lower web 14. The deformed lower web 14 is then presented to a loading station 22 whereupon a user or machine loads products, e.g., hot dogs, cheese, etc., into the cavities 20. After product is loaded into the cavities 20, the filled cavities 20 are advanced to an upper web station 24 that supplies an upper web 26 of flexible material from a supply roll 28. As known in the art, upper web 26 of flexible material is placed atop the loaded cavities 20 whereupon the upper and lower web material is presented to a sealing station 30, which may evacuate the loaded cavities 20, and seals the upper and lower web material together. As known in the art, the sealing station 30 may include a heating assembly that heats the upper web 26 of flexible material to seal the upper web 26 to the lower web 14 of flexible material. The sealed packages may then be presented to a cutting station (not shown), labeling station (not shown), and bulk packaging station (not shown) as generally understood in the art. As further known in the art, the packaging machine 10 may also include a display unit 32 that presents a touch screen, for instance, to allow a user to control the food packaging machine 10 while proximate the loading station 22.

Figure 2:
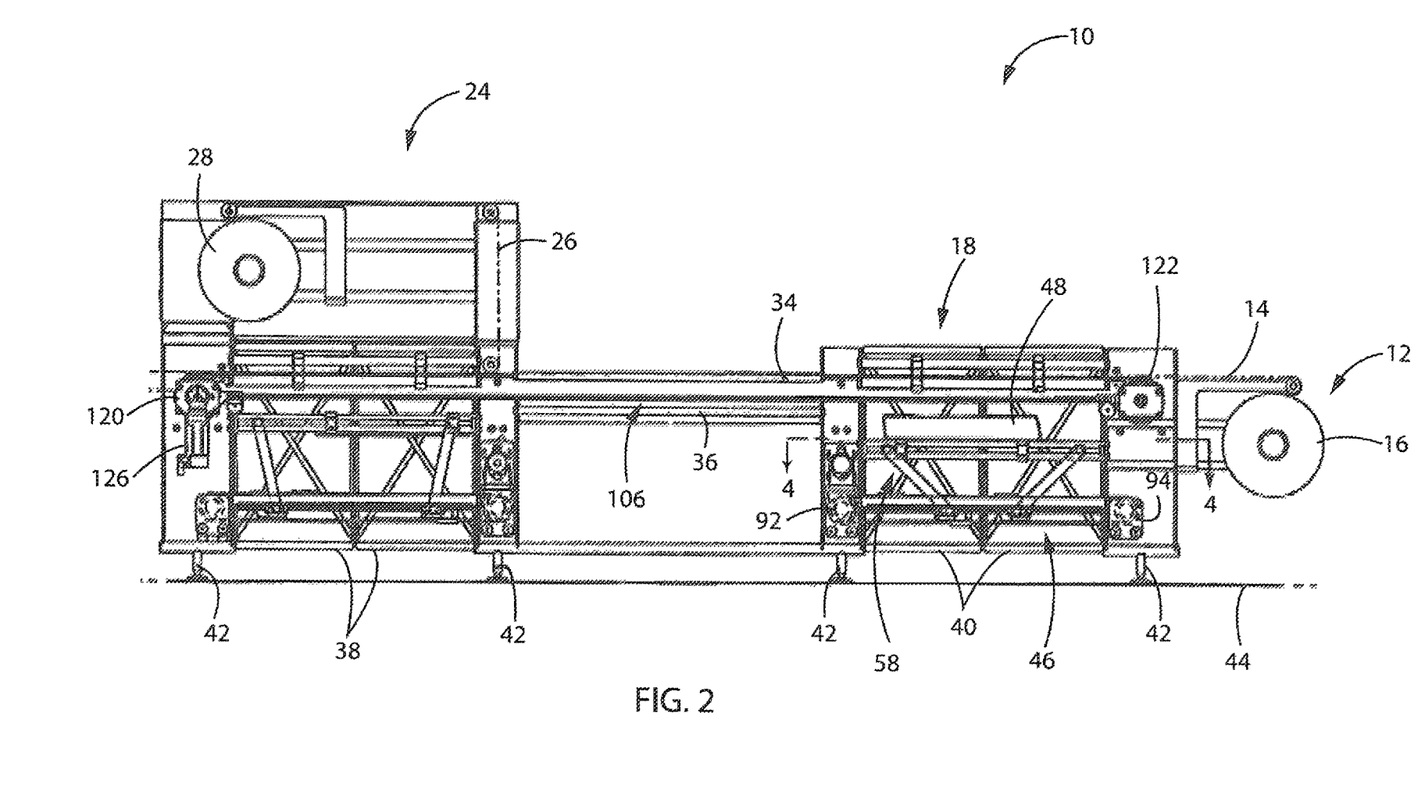
FIG. 2 is a side elevation view of the food processing machine of FIG. 1, with guards and covers removed to expose the components of the machine.

With further reference to FIG. 2, the various components of the food packaging machine 10 are supported by a frame assembly that includes a pair of spaced parallel upper frame members 34 and lower spaced frame members such as shown at 36, 38, and 40. Legs 42 support the frame members in a raised position above floor 44. As will be described, the frame members are joined using a suitable adhesive.

Figure 3:
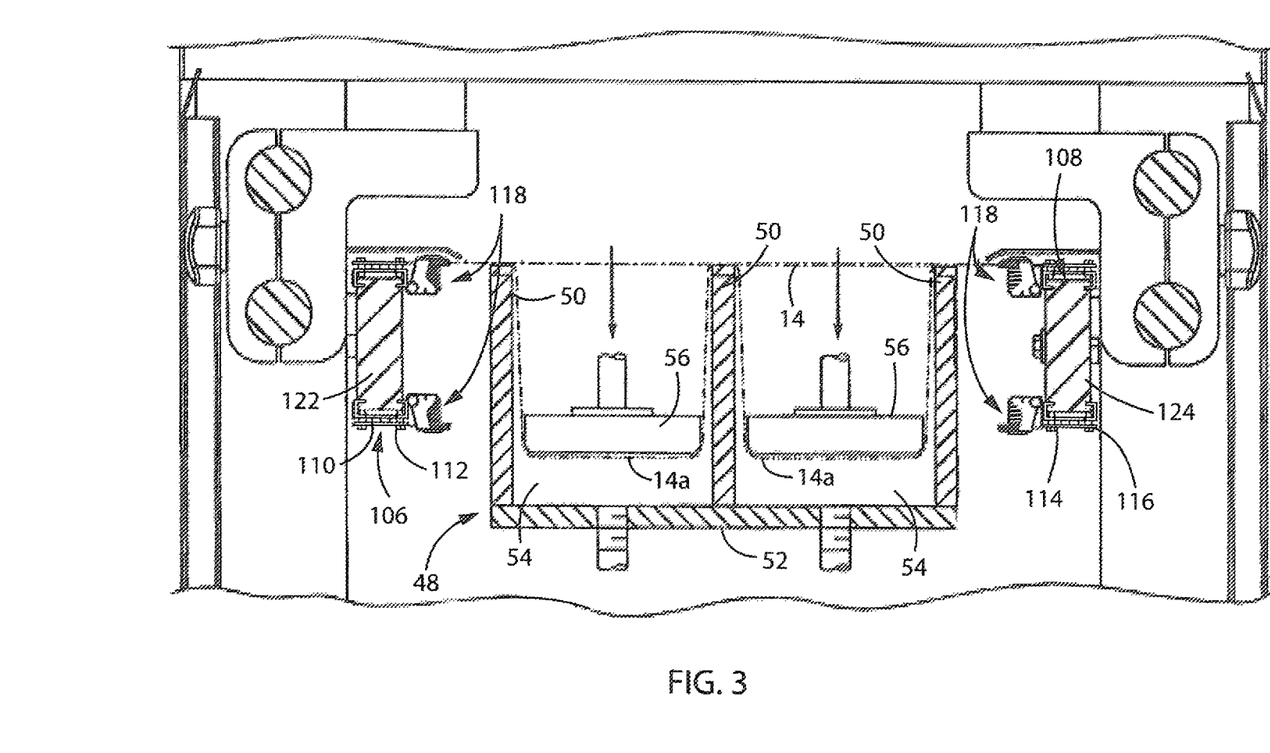
FIG. 3 is a section view of the food processing machine of FIG. 1 taken along line 3-3 of FIG. 1.

The formation station 18 includes a lift mechanism 46 that reciprocally moves a formation box 48 between a lowered position and a raised position. Referring briefly to FIG. 3, the formation box 48 is defined by a series of spaced and parallel walls 50 commonly supported by a base 52. The spacing between the parallel walls 50 and the base collectively form cavities 54 that may be evacuated using a vacuum (not shown) so as to draw the lower web material 14 into the cavities 54. More particularly, when the formation box 48 is in its fully raised position, the formation box 48 abuts an underside of lower web material 14. The cavities 54 may then be evacuated to draw the lower web 14 of flexible material downward into the cavities 54 to form deformed lower web 14a. Separate plug resistor stamps 56 may also be used to help force the lower web 14 of flexible material into cavities 54 so as to deform the lower web 14 of flexible material. This process forms a number of cavities 20 in the lower web 14 that may be used for receiving product as described with respect to FIG. 1.

Figure 4:
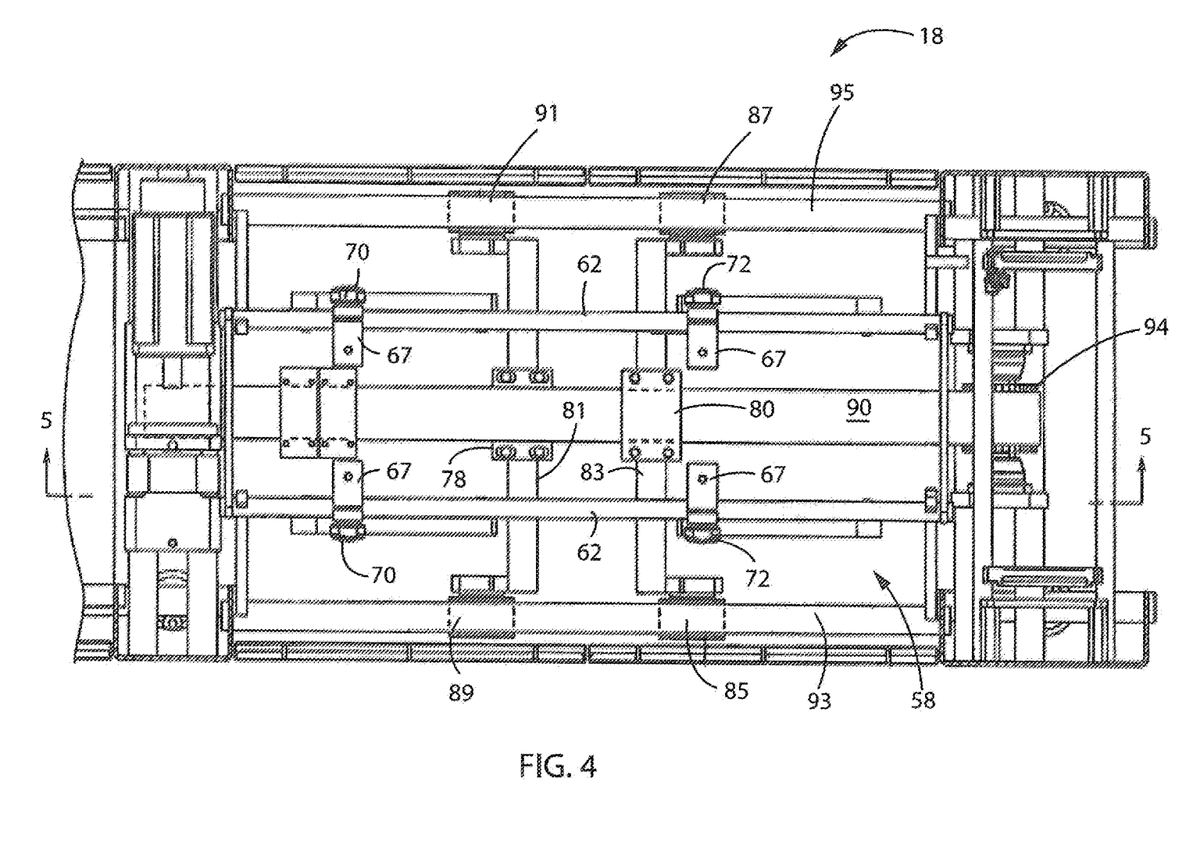
FIG. 4 is a section view of the food processing machine of FIG. 1 taken along line 4-4 of FIG. 2.
Figure 5:
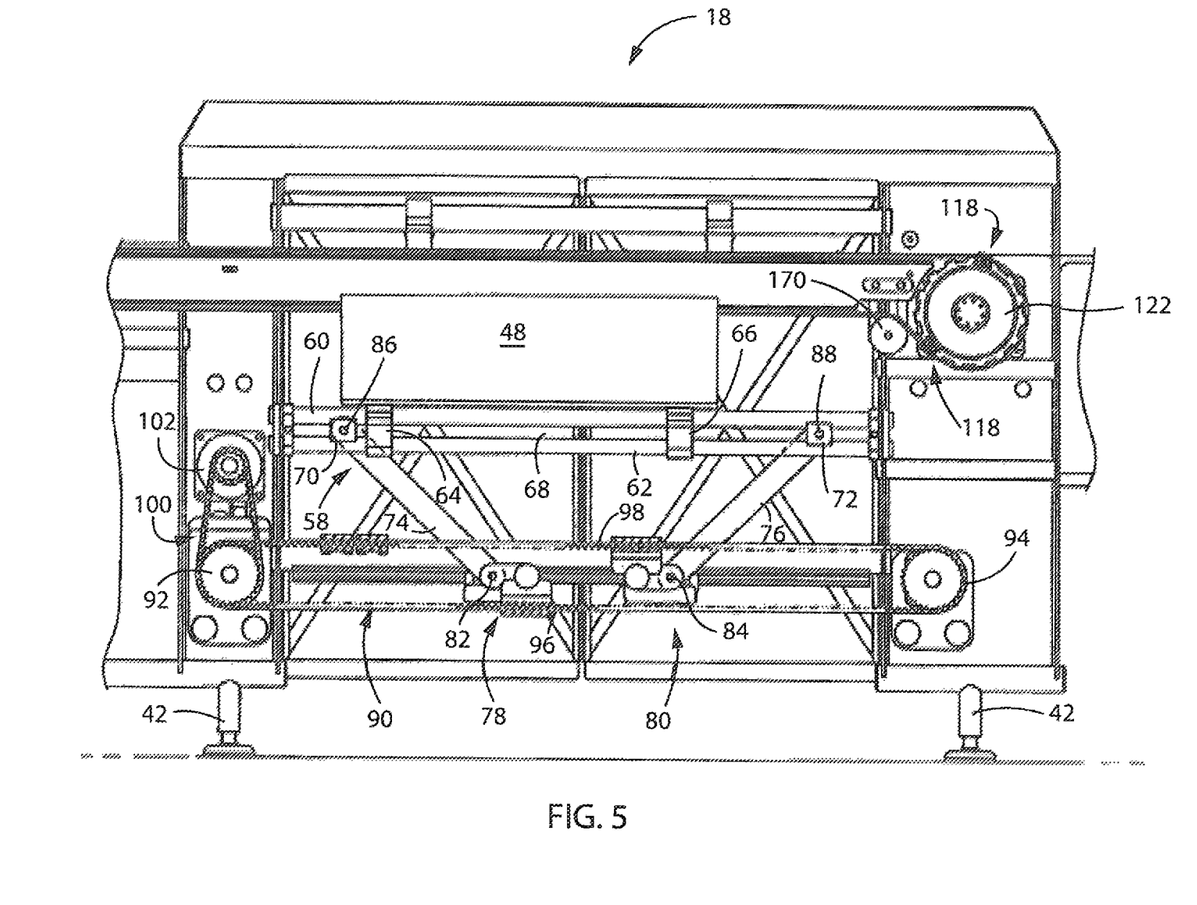
FIG. 5 is a section view of the formation station of the food processing machine of FIG. 1 taken along line 5-5 of FIG. 4.

Referring again to FIG. 2 and with further reference to FIGS. 4-5, the formation box 48 is supported by a rack 58 that includes a pair of plates 60, 62 oriented parallel to one another and coupled by a pair of braces 64, 66. The formation box 48 is mounted to the rack 58 by brackets 67. The braces 64, 66 hold the plates 60, 62 so that a slot 68 is formed between the plates 60, 62. The slot 68 defines a track along which a pair of rollers 70, 72 may translate. The rollers 70, 72 are each coupled to an arm 74, 76, respectively, which are connected to carriages 78, 80, respectively. The arms 74, 76 are connected to the rollers 70, 72 and carriages 78, 80 by pivot connections, generally shown at 82, 84, 86, and 88. These connections allow the arms to pivot relative to the carriages and the rollers. As shown in FIG. 4, each carriage supports a pair of arms, of which a single arm is shown for each carriage in FIG. 2.

Figure 6:
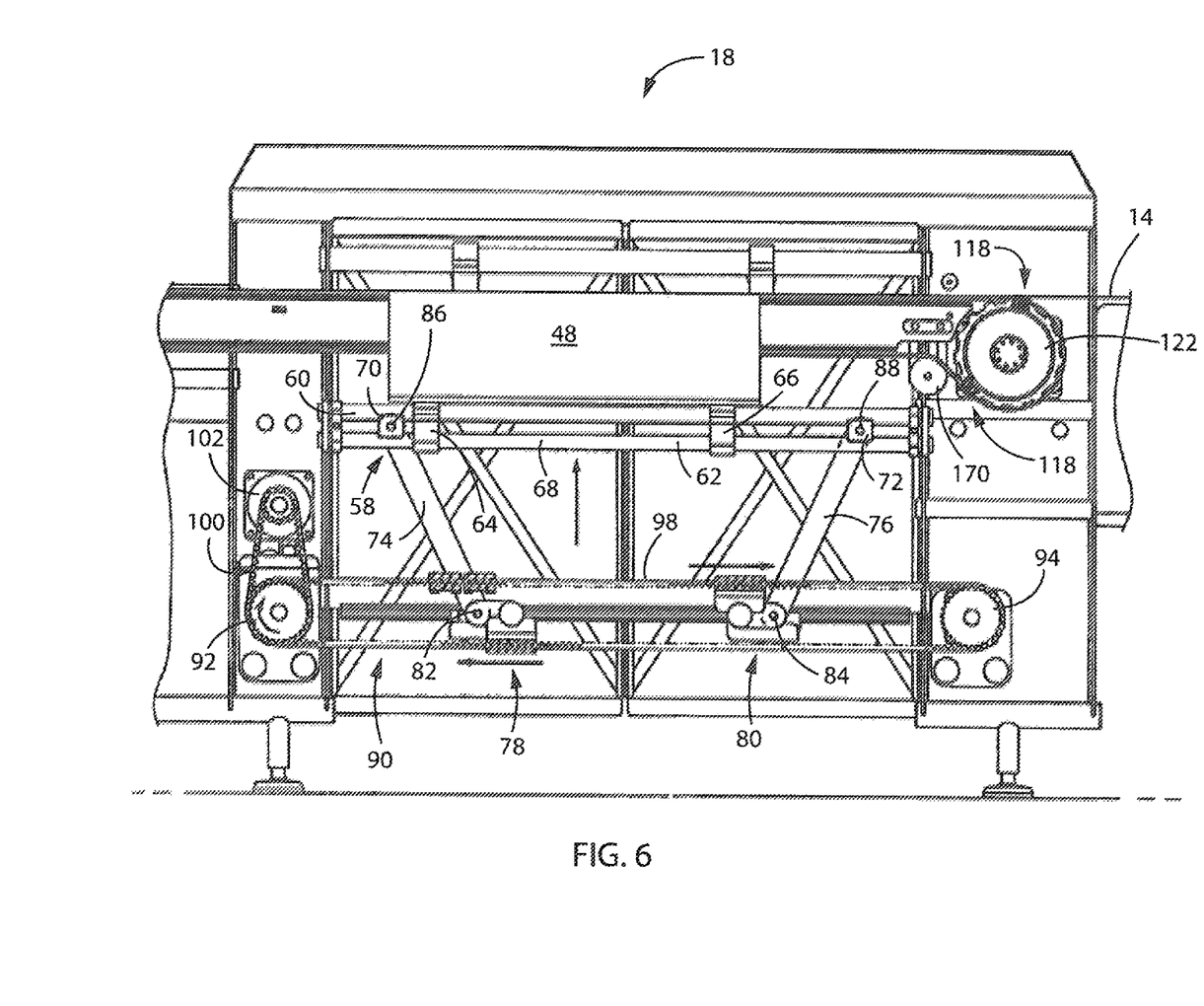
FIG. 6 is a view similar to that of FIG. 5 showing a formation box of the formation station lifted to a raised position.

The carriages 78, 80 are coupled, in a fixed connection, to a driven belt 90 that is trained around a driven wheel 92 and a follower wheel 94. As illustrated in FIG. 5, carriage 78 is connected to a lower belt portion 96 and carriage 80 is connected to an upper belt portion 98. The driven wheel 92 is driven by a drive belt 100 trained about the driven wheel 92 and a drive wheel 102. Rotation of drive wheel 102 causes rotation of driven wheel 92. As the driven wheel 92 is rotated, the driven belt 90 is rotated about its path defined by driven wheel 92 and follower wheel 94. Rotation of the driven belt 90 in a clockwise direction, resulting from a clockwise rotation of driven wheel 92, causes the carriages 78, 80 to move away from one another. Specifically, during a clockwise rotation of the driven wheel 92, the driven belt 90 causes carriage 78 to move toward the driven wheel 92 and causes carriage 80 to move toward the follower wheel 94. This movement also causes arms 74, 76 to pivot about pivots 82, 84, respectively. Moreover, the arms 74, 76 are caused to pivot about pivots 86, 88, respectively. Ultimately, this results in the arms 74, 76 moving toward a more upright position, which causes the rollers 70, 72 to roll within slot 68 toward one another and, as a result, raise the formation box 48, as shown in FIG. 6. Similarly, when the driven wheel 92 and the driven belt 90 are rotated in a counter-clockwise rotation, the carriages 78, 80 move toward one another and cause the arms 74, 76 to lower the formation box 48, such as shown in FIG. 5. In this regard, the driven belt 90 is a slave to the drive belt 100, such that the driven belt 90 is not translated along its rotational path until the drive belt 100 is translated along its rotational path.

Referring briefly back to FIG. 4, each carriage 78, 80 includes a shaft 81, 83, respectively, that is connected to a pair of cam rollers 85, 87 and 89, 91, respectively. The cam rollers 85, 89 are designed to roll along guide track 93 whereas cam roller 87, 91 are designed to roll along guide track 95. In this regard, the cam rollers 85, 87, 89, and 91 function to maintain the position of the belt 90 as the belt 90 is translated.

Referring back to FIG. 2, in one embodiment, the upper web station 24 includes a lift mechanism 104 similar to that shown for the formation station 18 shown and described above with respect to FIG. 4.

As further shown in FIGS. 2-3, the lower web 14 of flexible material is advanced from supply roll 16 through the formation station 18, the loading station 22, and to the upper web station 26 by a pair of belts 106, 108. Each belt 106, 108 is spliced to have separate belt portions 110, 112 and 114, 116, respectively. Each belt portion carries an array of clamps 118 that selectively grip and release the lower web 14 of flexible material. The belts portions 106, 118 are trained about a respective pair of wheels, of which wheels 120, 122 associated with belt 106 are seen in FIGS. 2, 5, and 6. One of the wheels 124 associated with belt 108 may be seen in FIG. 3. In a preferred embodiment, wheel 120, which is a drive wheel driven by motor assembly 126, is located at or near the upper web station 24, whereas wheel 122 is a driven wheel posited at or near the supply roll 16. It is understood that wheel 122 may be driven by a motor assembly. Further, it is also contemplated that both wheels 120, 122 may be separately motor driven. In a similar manner, wheel 124 is also a follower wheel and is rotated by a separate drive wheel (not shown), opposite of drive wheel 120, via translation of belt 108.

As was noted with respect to FIG. 2, the food packaging machine 10 includes two belts 106, 108 spaced from one another and each including clamps to grip and advance the web 14 of flexible material from the supply roll 16 through the various stations of the food packaging machine. In one embodiment, optical sensors are used to provide feedback to motor controllers (not shown) for the respective motors (motor 126 for belt 106) so that operation of the motors for each belt can be synchronized. It is recognized that other types of sensors may also be used to provide positional feedback to the motor controllers for motor synchronization. Alternately, a single motor could be used to drive the drive wheels and thus the belts.

Figure 7:
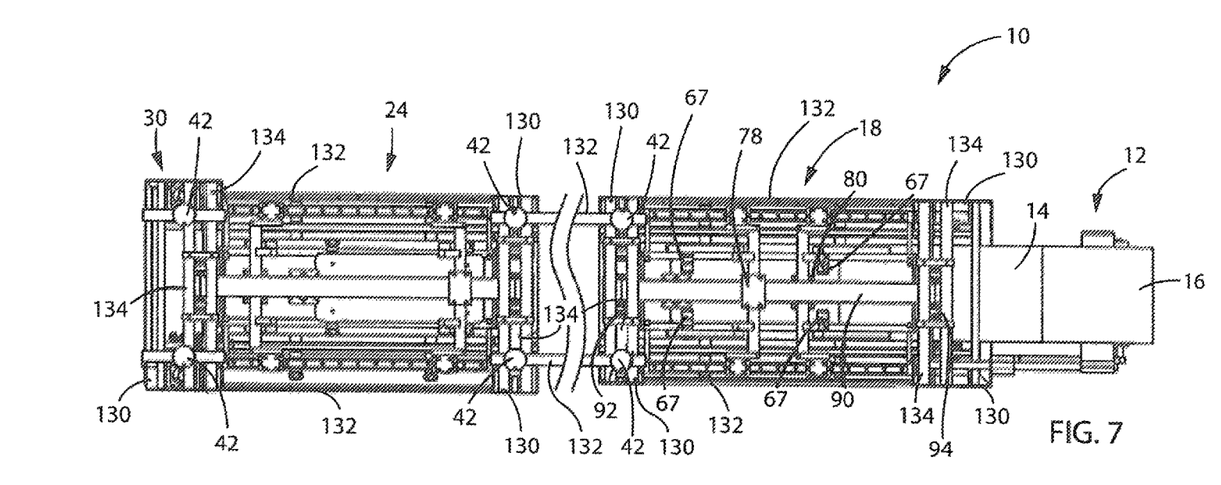
FIG. 7 is a bottom plan view of the food processing machine of FIG. 1.

Referring again to FIG. 1, and with further reference to FIG. 7, the food packaging machine 10 is comprised of a stainless frame assembly 128 that includes upright members 130, longitudinal support members 132, and lateral support members 134. As particularly shown in FIG. 1, the support members 132 may support various access doors 136 and access panels 138 that control access to the internal components of the food packaging machine 10. In one representative embodiment, the upright members 130 and support members 132, 134 are formed of stainless steel as known in the art. It is recognized that the frame assembly 128 may include additional structural members not explicitly described herein as known in the art.

Figure 8:
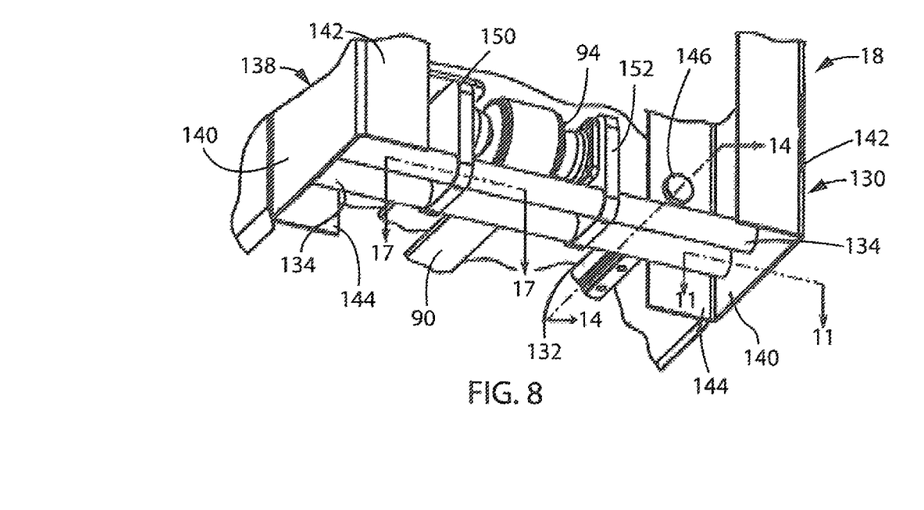
FIG. 8 is an isometric view of a lower portion of the food processing machine of FIG. 1.

For purposes of illustration, the interconnection of the frame members will be described with respect to the formation station 18, but it is understood that other portions of the machine 10 may be similarly connected. As shown in FIG. 8, a portion of the formation station 18 is defined by a pair of upright members 130 spaced from one another by a pair of rod-shaped lateral support members 134. Each upright member 130 has an end wall 140 and a pair of sidewalls 142, 144 arranged parallel to one another and perpendicular to the end wall 140. The lateral support members 134 extend between and are secured to the end walls 140 of the upright members 130, and in the illustrated embodiments provide support for follower wheel 94, which will be described in greater detail below. Each longitudinal support member 132 (only one of which is shown in FIG. 8) is secured, at its end, to sidewall 144 of a respective upright member 130. It is understood that the opposite end of the longitudinal support member 132 is secured to another upright member (not shown). As will be described in greater detail below, a locking cap 146 is used to couple the support member 132 to the sidewall 144.

Figure 9:
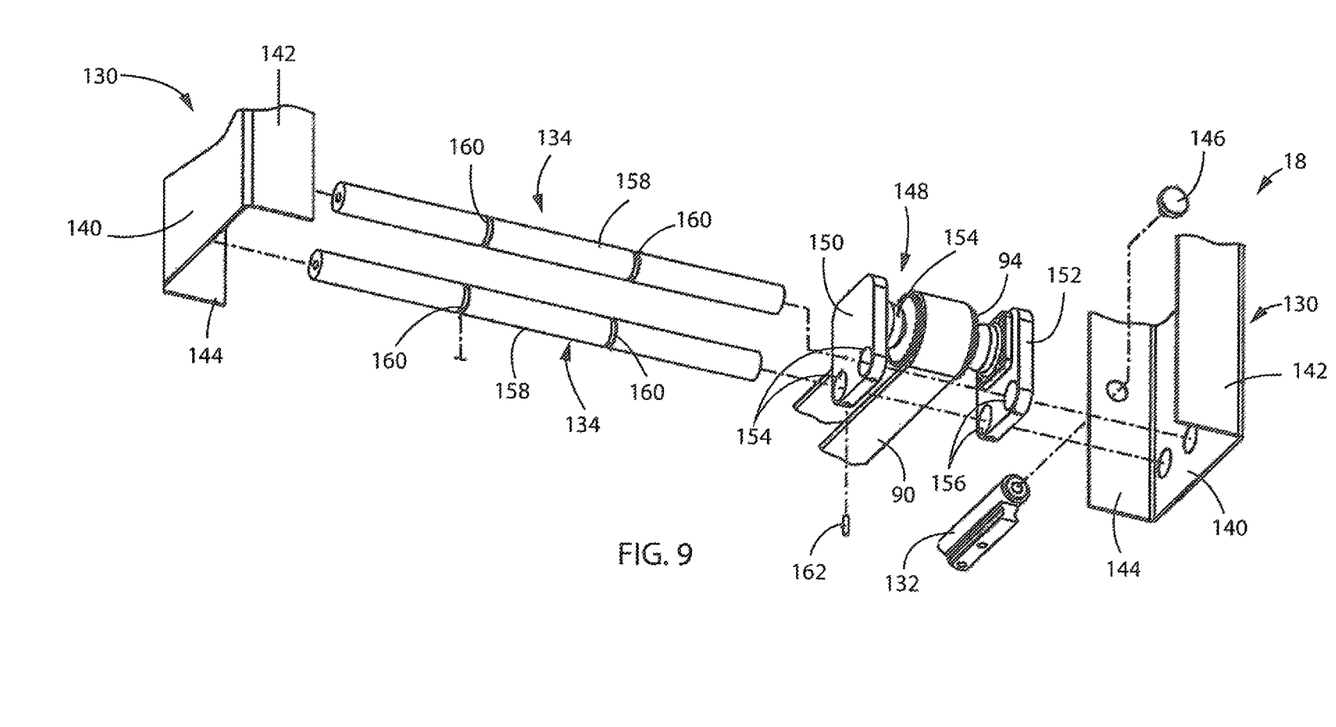
FIG. 9 is an exploded view of a portion of the food processing machine shown in FIG. 8.

The follower wheel 94, which drives belt 90 in a manner as described above, is supported by a hub structure 148 that includes a pair of hub support members 150, 152 that collectively support an axle 154 to which the follower wheel 94 is mounted so as to rotate therearound. Each hub support member 150, 152 includes a pair of openings 154, 156, respectively, as shown in FIG. 9. The openings 154, 156 are designed to receive the support members 134 therethrough and thus define a passage that is generally perpendicular to the plane of the end walls 140 of the upright members 130.

The openings 154, 156 are aligned with one another and arranged so that the support members 134 are parallel to one another when the lower portion is assembled. Each support member 134 has a generally cylindrical body 158 in which grooves 160 are formed therein. As will be described below, holes formed in the grooves 160 receive a locking pin 162 (of which only one is shown in FIG. 9) to secure the support members 134 to the hub support members 150, 152. In the illustrated example, two support members 134 are shown supporting the follower wheel 94; however, it is understand that fewer or more than two support members may be used.

Referring now to FIGS. 10-17, the interconnection of the frame members will be described. It is understood that the interconnection of other frame members other than those specifically described herein may be interconnected in a similar manner as that which will be described. Additionally, it is understood that the frame assembly for the food packaging machine may be assembled in an order different from the order in which the frame members are shown in and described with respect to FIGS. 10-17. As will be described, adhesive, such as an epoxy, rather than weld material, is used to connect the frame members.

Figure 10:
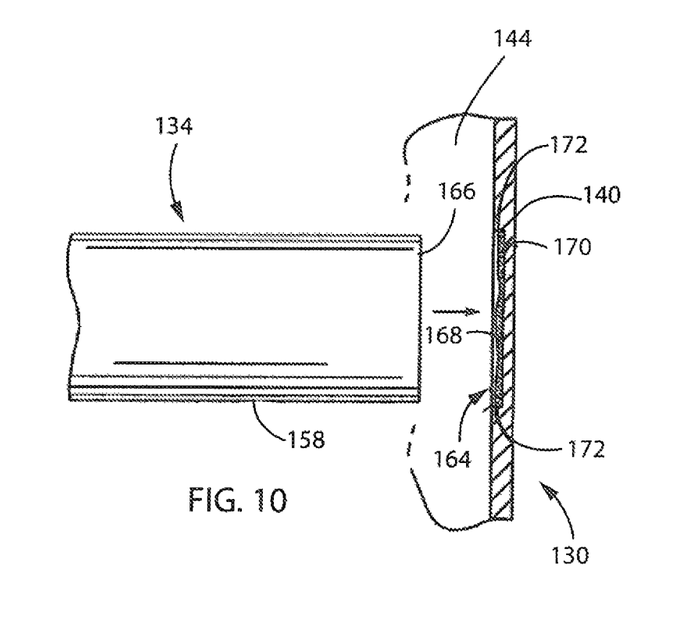
FIG. 10 is a section view of a frame member and a transverse support member of the food processing machine prior to bonding of the transverse support member to the frame member.

Referring now to FIG. 10, the end wall 140 of each upright remember 130 has a respective recess 164 formed therein for receiving an end 166 of a lateral support member 134. In FIG. 10, only one such recess 164 is shown, but it should be understood that the end wall 140 includes one recess 164 for each of the lateral support members 134 to be connected to the upright member 130. Thus, for the example shown in FIGS. 8 and 9, the end wall 140 will have two recesses 164; one for each of the support members 134. Adhesive 168 is placed in the recess 164, which in one embodiment is an epoxy with a high tensile strength, e.g., a tensile strength of at least 2000 psi. The adhesive 168 is preferably placed in the recess 164 so that all of the back wall 170 forming the recess 164 has adhesive placed thereon whereas only a portion of the sidewalls 172 forming the recess has adhesive placed thereon. In this regard, the entire volume defined by the recess is not filled with adhesive 168. Alternately, the adhesive 168 may be placed on the surface of the end 166 of the support member body 158 rather than in recess 166.

Figure 11:
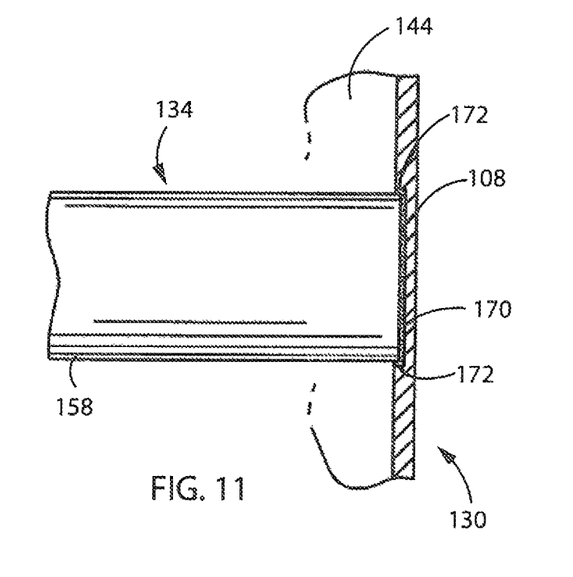
FIG. 11 is a section view of the lower portion shown in FIG. 8 taken along line 11-11 of FIG. 8 illustrating interconnection of the frame member and the transverse support member shown in FIG. 10.

Once the adhesive 168 has been deposited, the support member 134 is inserted into recess 166, as illustrated in FIG. 11. The insertion of the support member 134 into the recess 164 forces the adhesive 168 to spread as the end 166 of the support member body 158 is moved toward the back wall 170 of the recess. As a result, the adhesive 168 spreads radially away from the center of the recess 164 and results in portions of the adhesive 168 bonding between the side walls 172 of the recess 164 and the exterior surface of the support member body 158. Preferably, the amount of adhesive 168 deposited in the recess 164 is such that that adhesive 168 spreads within but does not leak out of the recess 164. In this regard, adhesive residue does not form on the exposed exterior surface of the support member body 158. It is understood however that any residual adhesive that does leak from the recess 164 as a result of insertion of the support member 134 into the recess 164 may be wiped from the exterior surface of the support member 134 using a suitable solution.

While the connection of only one end of the support member 134 is shown, it is understood that the connection of the opposite end of the support member 134 to an opposite upright member 130 may be carried out in a similar manner to that described above.

Figures 12, 13:
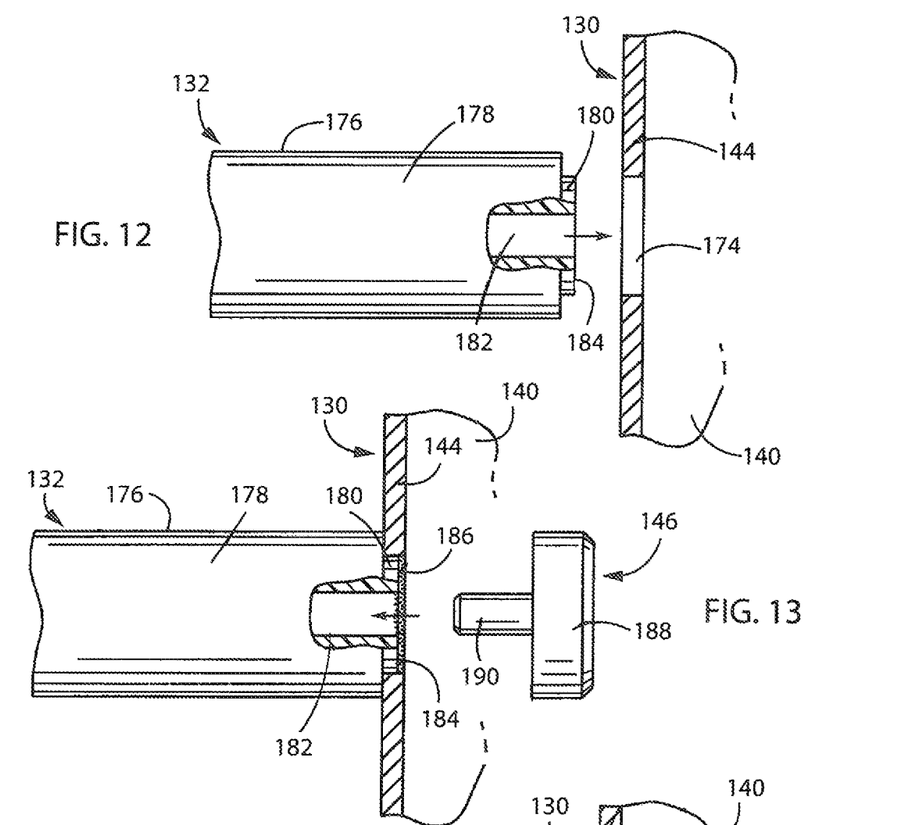
FIG. 12 is a section view of the frame member and a connecting support member of the food processing machine prior to bonding of the connecting support member to the frame member.
FIG. 13 is a section view of the connecting member interfit within an opening in the frame member prior to bonding of a cap member to the frame member.
Figure 14:
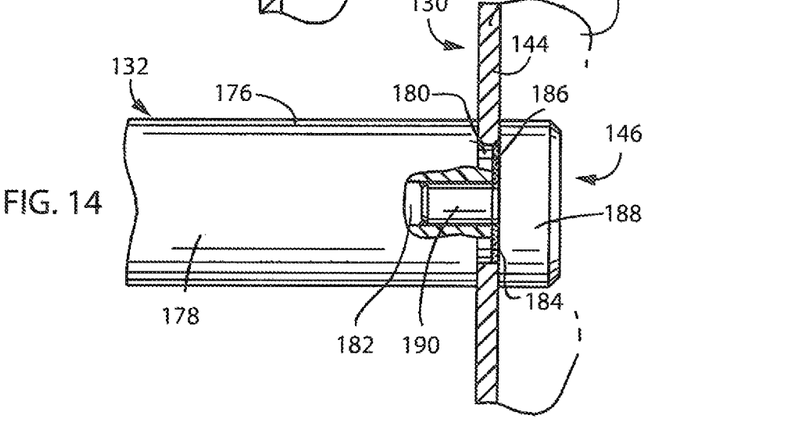
FIG. 14 is a section view of the lower portion shown in FIG. 8 taken along line 14-14 of FIG. 8 illustrating interconnection of the frame member, the connecting member and the cap member shown in FIG. 13.

Referring now to FIGS. 12-14, the connection of a representative longitudinal or connecting support member 132 to the sidewall 144 of an upright member 130 is somewhat similar to the connection of a lateral support member to the upright member. More particularly, the sidewall 144 has an opening 174 formed therein. The shape and size of the opening 174 is matched to the size and cross-sectional shape of the support member 132, or at least a portion thereof. In contrast to the recess 164 of the back wall 140 described above, the opening 174 extends all the way through the sidewall 144.

The longitudinal support member 132 has a member body 176 defined by an exterior portion 178 and an inner portion or core 180. The inner core 180 extends axially past the end of the exterior portion 178. A bore 182 is formed in the inner core and extends axially inwardly from the face 184 of the inner core 180. In an exemplary embodiment, the support member 132 has a generally cylindrical shape. In this regard, the exterior portion 178 and the inner core 180 are each cylindrical in shape; however, it is understood that the inner core 180 may have a shape different from the exterior portion 178. The inner core 180 extends axially past the end of the exterior portion 178 by a distance that is slightly less than the thickness of the side wall 144.

The support member 132 is affixed to the upright member 130 by inserting the exposed end of the inner core 180 into the opening 174 formed in the upright member 130, as shown in FIG. 13. Adhesive 186 is then applied to the face 184 of the inner core 180 and is preferably applied in sufficient amount such that the unoccupied volume of the opening 174 is filled with the adhesive 186. In this regard, the inlet into the bore 182 is also covered with adhesive 186. The locking cap 146, which has a head 188 and a shank 190, is then aligned with the opening 174 and the bore 182 of the inner core 180. Once aligned, the locking cap 146 is translated toward the bore 182 such that the shank 190 is inserted into the bore 182. The head 188 of the locking cap 146 is larger than the opening 174, thus, the head 188 will engage against the sidewall 144 of the upright member 130, as shown in FIG. 14.

As further shown in FIG. 14, the insertion of the shank 190 through the opening 174 will cause adhesive 186 to be pushed axially into the bore 182 of the inner core 180. Additionally, adhesive 186 applied to the face 184 of the inner core 180 will bond with the head 188 of the locking cap. Thus, when the adhesive cures, the shank 190 of the locking cap 146 will be bonded to the inner core 180 and the head 188 of the locking cap 146 will be bonded to the face 184 of the inner core 180. Further, the adhesive 186 axially between the face 184 of the inner core 180 and the head 188 of the locking cap 146 will bond against the sidewall 144 of the upright member 130. Thus, all three components (the support member 132, the upright member 130, and the locking cap 146) are joined together in a single adhesive bond. As further shown in FIG. 14, the adhesive 186 does not seep out of the opening 174 and onto the exterior surfaces of the support member 132, the sidewall 144, or the locking cap 146. It is contemplated however that any incidental adhesive residue may be wiped from the frame member using a suitable solution.

Figure 15:
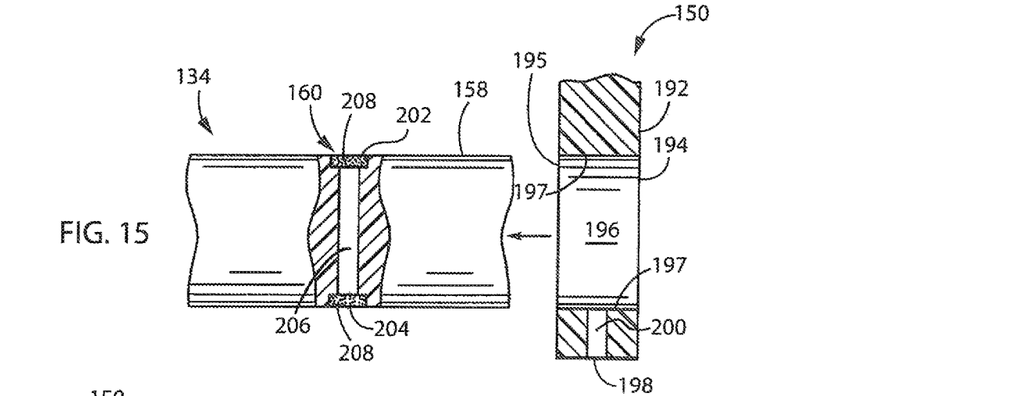
FIG. 15 is a section view of a transverse member prior to a drive hub support member being positioned over a groove formed in the transverse member.
Figures 16, 17:
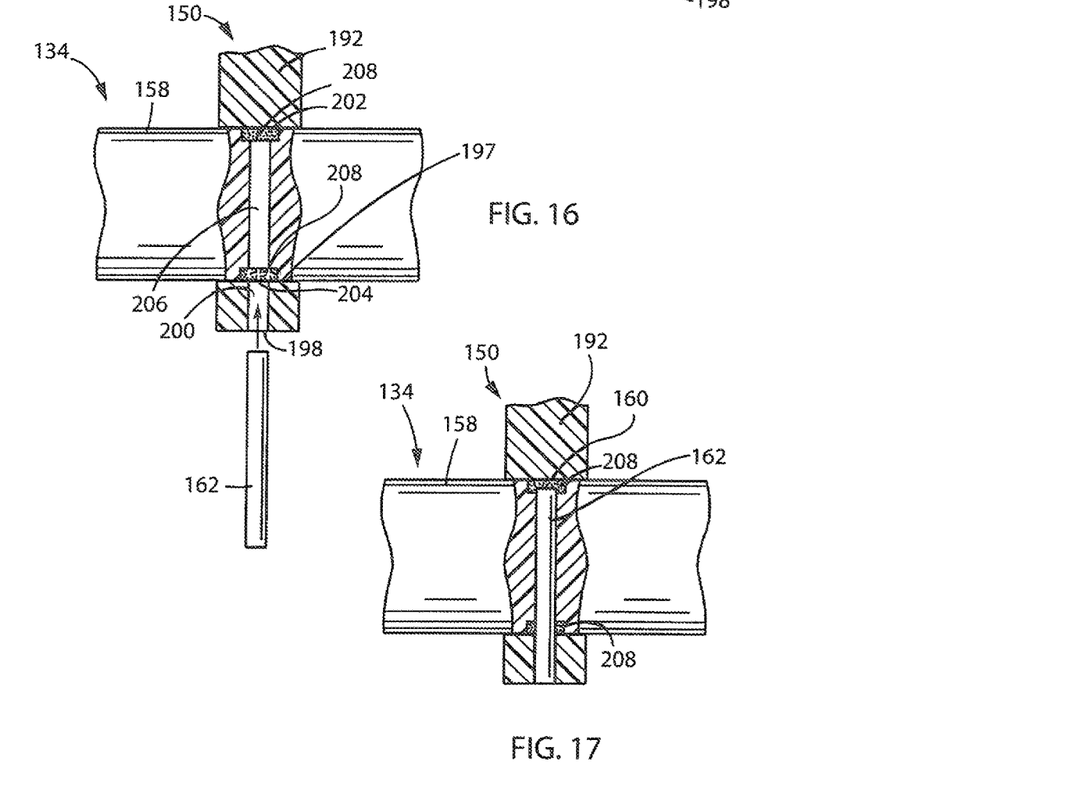
FIG. 16 is a section view similar to that shown in FIG. 15 with the drive hub support member fit over the groove and prior to insertion of a locking pin designed to couple the hub support member to the transverse member.
FIG. 17 is a section view of the drive hub support member coupled to the transverse member using a locking pin taken along line 17-17 of FIG. 8.

As shown in FIGS. 15-17, the hub support members 150, 152 are affixed to support members 134 using adhesive. For purposes of illustration, the connection of only one hub support member to one lateral support member will be described; however, it is understood that the connection of the other hub support member is accomplished in a similar manner. Also, the connection of the hub support members to the other lateral support member is similarly accomplished.

Hub support member 150 includes a body portion 192 having openings 194, 195 that together with inner wall 197 collectively define a lateral passage 196 and a second opening 198, perpendicular to the openings 194,195, and defining a transverse passage 200 that intersects the lateral passage 196.

As noted with respect to FIG. 9, each lateral support member 134 has a member body 158 with grooves 160 spaced from one another formed therein. Each groove 160 has a first opening 202 and a second opening 204 with a passage 206 formed therebetween. The width of the passage 206 is matched to the width of passage 200 formed in the hub support member 150. Moreover, the support member 134 is sized such that the hub support member 150 may be slid axially onto the member body 158. In a preferred embodiment, the diameter of the support member 134 is slightly less than the diameter of the passage 196 so that separation between the hub support member 150 and the exterior surface of the support member 134 is minimized.

To connect the hub support member 150 to the support member 134, adhesive 208 is deposited into the groove 160. Preferably, a sufficient amount of adhesive 208 is placed into the groove so that substantially the entire peripheral volume defined by the groove 160 contains adhesive 208. The hub support member 150 is then slid over the support member 134 until the passage 200 formed in the hub support member 150 is aligned with the passage 206 formed through the support member 134, as illustrated in FIG. 16. Once aligned, locking pin 162 is inserted into opening 198 through passage 200 and into opening 204 through passage 206. At the fully inserted position, shown in FIG. 17, the locking pin 160 engages adhesive 208 located in the groove 160 opposite opening 204. This functions to displace a portion of the adhesive in the groove 160, so that the adhesive is forced into the interstices between hub support member 150 and the support member 134. The adhesive 208 in the groove 160 bonds against the inner wall 197 of the hub support member 150.

The present invention has been described with respect to a food packaging machine, but it is understood that the invention may be applied to other machines in which compliance with sterility requirements must be met, such as food preparation machines, drug manufacturing systems, bottling systems, and the like.

It should be understood that the adhesive joints or unions as shown and described may be used in any desired location on the frame of the machine at which two components are stationarily secured together. It should also be understood that the various joints or unions may be used separately or in various combinations or configurations other than those specifically illustrated and described herein.

Many changes and will modifications could be made to the invention without departing from the spirit thereof. The scope of these changes will become apparent from the appended claims.

We claim:

1. A frame for a food processing machine comprising:
    a frame member defining first and second ends; and
    a support member secured to the frame member between the first and second ends of the frame member, wherein the support member includes an opening extending therethrough and wherein the frame member extends through the opening, wherein the frame member includes a peripheral groove having a transverse dimension less than a thickness of the support member;

wherein the frame member includes a transverse passage that opens onto opposite surfaces defined by the frame member and that are located at an interface between the frame member and the support member within the opening, wherein the transverse passage opens into the peripheral groove;

a pin positioned within the transverse passage, wherein the pin extends into the transverse passage through a passage defined by the support member that is aligned with the transverse passage when the frame member is positioned within the opening of the support member; and a bonding agent disposed within the opening at the interface between the frame member and the support member, and wherein the bonding agent is located within the peripheral groove.

2. A frame for a food processing machine comprising:

a frame member defining first and second ends; and a support member secured to the frame member between the first and second ends of the frame member, wherein the support member includes an opening extending therethrough and wherein the frame member extends through the opening;

wherein the frame member includes a transverse passage that opens onto opposite surfaces defined by the frame member and that are located at an interface between the frame member and the support member within the opening;

a pin positioned within the transverse passage, wherein the pin extends into the transverse passage through a passage defined by the support member that is aligned with the transverse passage when the frame member is positioned within the opening of the support member; and a bonding agent disposed within the opening at the interface between the frame member and the support member;

wherein the food processing machine further comprises a belt drive and wherein the support member supports the belt drive at a location spaced from the frame member.

3. The food processing machine frame of claim 2 wherein the belt drive includes a drive hub and the support member is coupled to the drive hub.

4. The food processing machine frame of claim 3 wherein the belt drive is operative to advance web material in a first direction and the support member extends from the frame member parallel to the first direction.

* * * * *